United States Patent
Kang

(10) Patent No.: US 7,421,152 B2
(45) Date of Patent: Sep. 2, 2008

(54) METHOD FOR RESIZING AN IMAGE USING THE INVERSE DISCRETE COSINE TRANSFORM

(75) Inventor: Jung Yong Kang, Kyunggi-do (KR)

(73) Assignee: Humax Co., Ltd., Yougin, Kyonggi-Do (KR)

( * ) Notice: Subject to any disclaimer, the term of this patent is extended or adjusted under 35 U.S.C. 154(b) by 446 days.

(21) Appl. No.: 10/691,561

(22) Filed: Oct. 24, 2003

(65) Prior Publication Data

US 2004/0091157 A1 May 13, 2004

(30) Foreign Application Priority Data

Oct. 25, 2002 (KR) .................. 10-2002-0066047

(51) Int. Cl.
G06K 9/32 (2006.01)
G06K 9/36 (2006.01)
G06K 9/46 (2006.01)

(52) U.S. Cl. ..................... 382/298; 382/250

(58) Field of Classification Search ............... 382/298, 382/250

See application file for complete search history.

(56) References Cited

U.S. PATENT DOCUMENTS

| 6,272,179 B1 * | 8/2001 | Kadono ............... 375/240.16 |
| 6,498,814 B1 * | 12/2002 | Morel ................. 375/240.12 |
| 6,658,056 B1 * | 12/2003 | Duruoz et al. ............ 375/240 |
| 2003/0021486 A1 * | 1/2003 | Acharya .................. 382/250 |

* cited by examiner

*Primary Examiner*—Matthew C. Bella
*Assistant Examiner*—Randolph Chu
(74) *Attorney, Agent, or Firm*—Birch, Stewart, Kolasch & Birch, LLP

(57) ABSTRACT

A method and apparatus are provided for resizing an image using an inverse discrete cosine transform (IDCT). A macro block of an original source image is enlarged to an arbitrary size using the inverse discrete cosine transform after the encoding type of the macro block is converted so that the macro block and the original source image have the same encoding type. Consequently, the original source image is always enlarged naturally in a digital video apparatus such as a digital broadcast receiver or an HD-TV.

15 Claims, 9 Drawing Sheets

FIG. 3
RELATED ART
 Odd Line
 Even Line
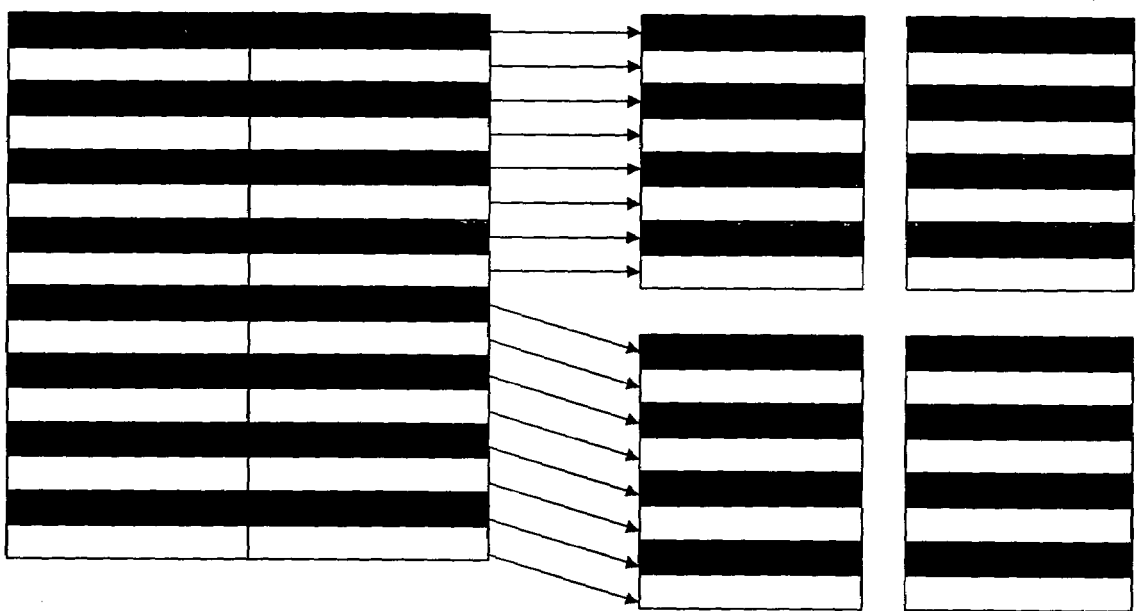

FIG. 7

*Picture Coding Extension*

```
picture coding extension () {
        extension_start_code
        extension_start_code_identifier
        Picture_structure
        top_field_first
        repeat_first_field
        chroma_420_type
        progressive_frame
        next_start_code()
}
```

FIG. 8

*Sequence_extension*

```
sequence_extension() {
        extension_start_code
        extension_start_code_identifier
        profile_and_level_indication
        progressive_sequence
        chroma_format
        next_start_code()
}
``` progressive_sequence = 1
: the coded video sequence cotains only progressive frame-pictures
progressive_sequence = 0
: the coded video sequence may cotain both frame-picture and field pictures

FIG. 9

*Macroblock_modes*

```
macroblock_modes() {
        macroblock_type
        if ((picture_structure=="Frame picture")&&
            (frame_pred_frame_dct == 0) &&
            (macroblock_intra||macroblock_pattern
        )) {
            dct_type
        }
}
``` dct_type = 1
: macroblock is field type DCT coded
dct_type = 0
: macroblock is frame type DCT coded

METHOD FOR RESIZING AN IMAGE USING THE INVERSE DISCRETE COSINE TRANSFORM

The present application claims, under 35 U.S.C. § 119, the priority benefit of Korean Patent Application No. 2002-66047 filed Oct. 25, 2002, the entire contents of which are herein fully incorporated by reference.

BACKGROUND OF THE INVENTION

1. Field of the Invention

The present invention relates generally to a method for resizing an image using an inverse discrete cosine transform (IDCT) and, more particularly, but not by way of limitation, to a method for enlarging an original image to an arbitrary resolution by performing an IDCT operation after making the encoding types of the original source image and the macro blocks identical.

2. Description of the Related Art

A general method for enlarging an image is to process the image in the spatial frequency domain using the discrete cosine transform (DCT). An original image is divided into two-dimensional image blocks, for example, image blocks of size 8×8 pixels, and a DCT operation is performed on each of the image blocks to produce a DCT coefficient block having low and high spatial frequency components.

It is well known that the combination of DCT and quantization results in many of the frequency components being zero, especially the coefficients for high spatial frequencies, because most of the energy in the original image is typically concentrated in low spatial frequencies.

A common method taking advantage of this feature appends columns and rows of zeros to the high frequency area in the DCT coefficient block for increasing the size of the DCT coefficient block to integral multiples of 8×8, for example, 16×16 or 24×24. An inverse DCT operation on the increased-size DCT coefficient block leads to an enlarged image block.

The frequency-domain method is expected to gather popularity for resizing images because the algorithm is relatively simple and does not deteriorate the quality of the enlarged image. Methods for resizing images in the spatial frequency domain are disclosed in, for example, U.S. Pat. No. 5,737,019 issued on Apr. 7, 1998, Korea patent publication No. 1999-64158 published on Jul. 25, 1999, and Korea patent publication No. 2001-49039 published on Jun. 15, 2001.

While the methods disclosed in the referenced patents and publications may show good results, there is a major limitation that an image cannot be enlarged to an arbitrary size and can only be enlarged to integral multiple times its original size. Also, adequate schemes for preventing possible distortions in the enlarged image after the image is enlarged to an arbitrary size have not been addressed yet.

In the meantime, a new image resizing method has been proposed in Korea patent application No. 2002-63600 filed on Oct. 17, 2002 to solve those problems. FIG. 1 depicts the structure of an image resizing apparatus such as an image scaler using this method. The apparatus comprises a discrete cosine transform (DCT) unit 10, a zero appending unit 11, a k-coefficient multiplying unit 12, and an inverse discrete cosine transform (IDCT) unit 13.

The DCT unit 10 divides an original source image into macro blocks of size M×N pixels and performs a DCT operation on each of the macro blocks to produce a corresponding DCT coefficient block. The zero appending unit 11 appends rows and columns of zeros to the high frequency area in each DCT coefficient block as many as required.

The k-coefficient multiplying unit 12 calculates the k-coefficient for the zero-appended DCT coefficient block and multiplies each element of the zero-appended DCT coefficient block by the k-coefficient. An enlarged image block of size P×Q pixels is obtained by an IDCT operation of the IDCT unit 13 on the zero-appended DCT coefficient block multiplied by the k-coefficient.

The above procedure leads to an image enlarged to an arbitrary resolution without having the resulting enlarged image distorted.

Original source images received through digital broadcasts or reproduced from an optical disk such as a DVD may be encoded as either a frame type or a field type depending upon the source contents. For example, movies displayed by the progress scan are frame-type encoded and video camera images displayed by the interlaced scan are field-type encoded.

A macro block, which is the basic image unit of the MPEG format, is encoded in such a way that a high compression rate is obtainable and thus encoded either as a frame type or a field type by referring to the video data within the macro block. As a result, the encoding type of a macro block does not always coincide with the encoding type of the original source image, as shown in FIGS. 2 and 3.

When a macro block is enlarged in a digital broadcast receiver such as a set-top box or in an optical disk drive such as a DVD player, the enlarged image becomes distorted unless the encoding type of the macro block is the same as that of the original source image, which will be explained in detail with reference to the accompanying drawings.

In FIG. 4, a frame-type original image is enlarged, wherein the original image has 8 black horizontal lines alternate with 8 white horizontal lines and comprises discrete cosine transformed odd-field macro blocks having 8 black horizontal lines and discrete cosine transformed even-field macro blocks having 8 white horizontal lines. Enlarging the macro blocks leads to odd-field macro blocks having 16 black horizontal lines and even-field macro blocks having 16 white horizontal lines.

If the enlarged macro blocks are merged into a frame-type picture, the enlarged picture contains 16 black horizontal lines alternate with 16 white horizontal lines, which is not intended by the enlargement. As a result, if the enlarged picture is displayed by the progressive scan scheme, a completely different image having not 8 black lines but 16 black lines is obtained, which is a problem.

In FIG. 5, a field-type original image is enlarged, wherein the original image has 8 black horizontal lines alternate with 8 white horizontal lines and comprises discrete cosine transformed frame-type macro blocks each having 4 black horizontal lines alternate with 4 white horizontal lines. Enlarging the macro blocks leads to macro blocks each having 16 lines wherein black, gray, white, and gray lines are displayed repeatedly in such order. If these enlarged macro blocks are merged into a field-type picture, the enlarged picture contains 32 horizontal lines having repeated black, gray, white, and gray lines. As a result, if the enlarged picture is displayed by the progressive scan scheme, the odd-field image has alternate black and white lines and the even-field image only has gray lines, which is completely different from the original image.

SUMMARY OF THE INVENTION

It is an object of the present invention to provide a method and apparatus for enlarging an image, which overcome the problems and limitations of the related art.

It is another object of the present invention to provide a method and apparatus for enlarging an image without resulting in distortions by making the encoding type of macro blocks identical to the encoding type of the original image and enlarging the macro blocks using the inverse discrete cosine transform.

A method for resizing an image using the inverse discrete cosine transform (IDCT) in accordance with an embodiment of the invention includes the steps of (a) checking the encoding type of an original source image and the encoding type of a discrete cosine transformed macro block, (b) converting the encoding type of the macro block into a frame type or a field type if the checked two encoding types are different, and (c) enlarging the converted macro block using the inverse discrete cosine transform.

An apparatus for resizing an image using the inverse discrete cosine transform (IDCT) in accordance with an embodiment of the invention includes a detecting unit for detecting the encoding type of a macro block, a converting unit for converting the encoding type of the macro block to either a field type or a frame type, a control unit for controlling the converting unit depending upon the detected encoding type of the macro block and the encoding type of an original source image, and an enlarging unit for enlarging the macro block received from the converting unit using the inverse discrete cosine transform.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 3 illustrates general frame-type macro blocks;

FIGS. 7-9 depict information searched by the preferred embodiments of the invention;

DETAILED DESCRIPTION OF THE PREFERRED EMBODIMENTS

In order that the invention may be fully understood, preferred embodiments thereof will now be described with reference to the accompanying drawings.

Figure 1:
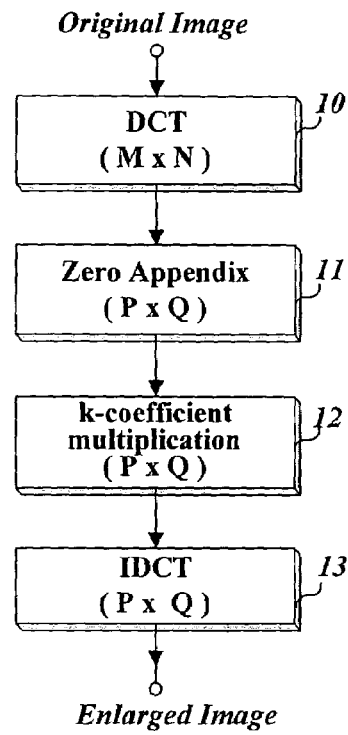
FIG. 1 depicts the structure of a general image resizing apparatus using the IDCT.
Figure 2:
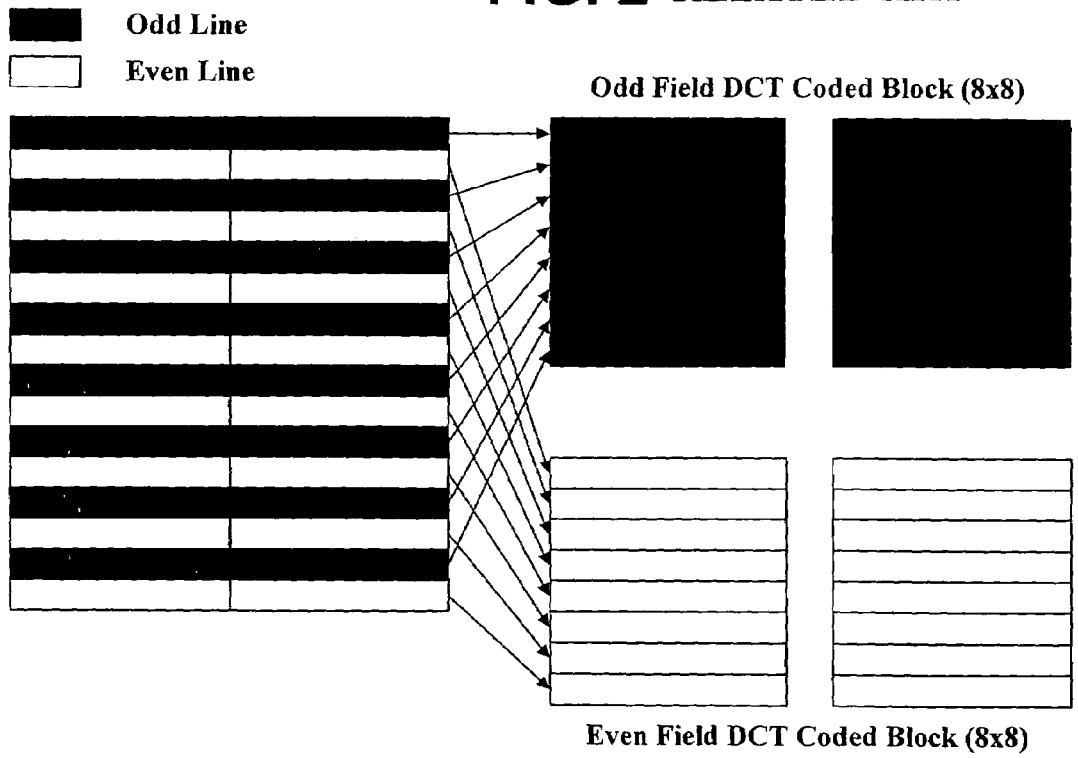
FIG. 2 illustrates general field-type macro blocks.
Figure 4:
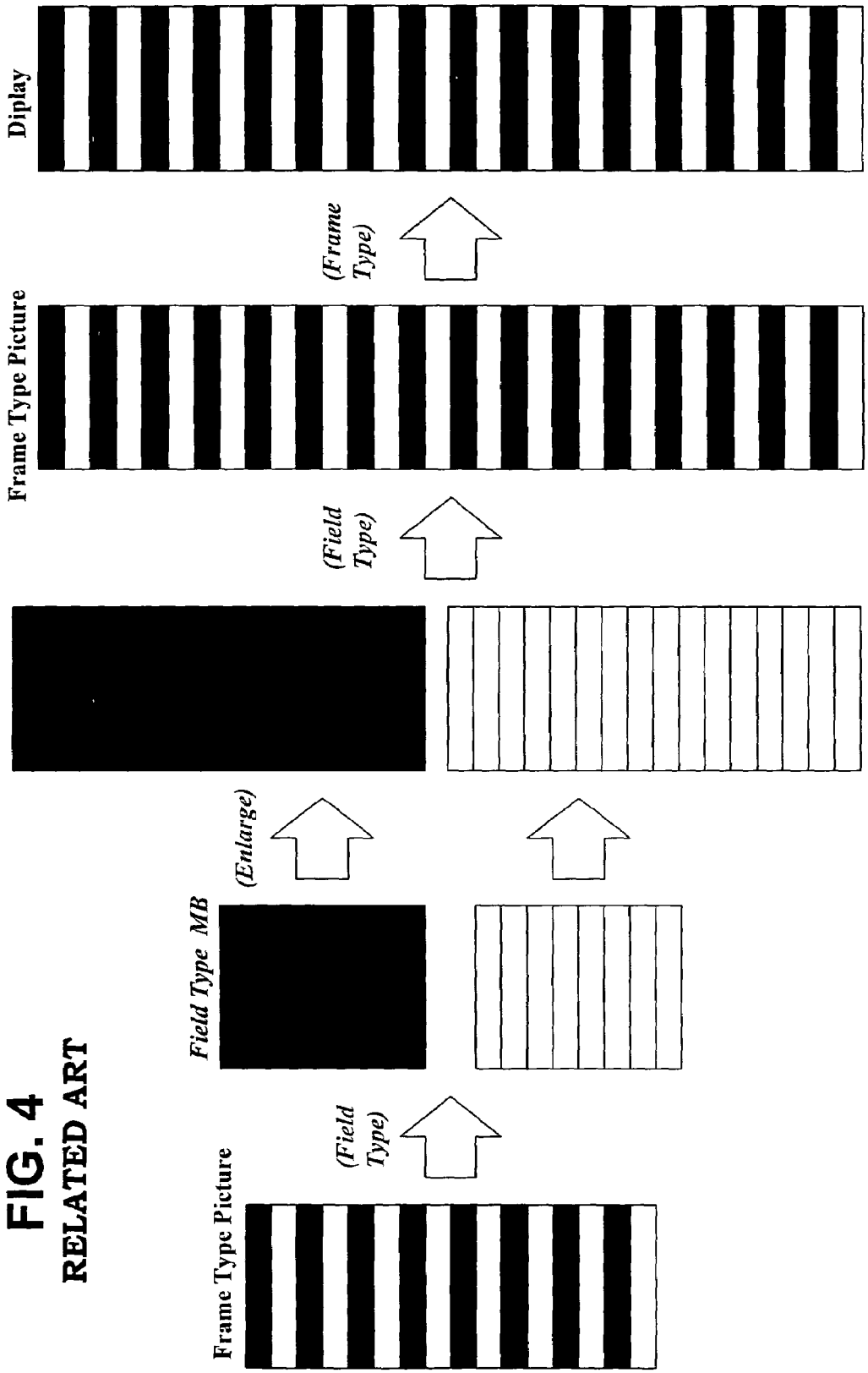
FIG. 4 illustrates an example wherein field-type macro blocks are enlarged in an abnormal manner.
Figure 5:
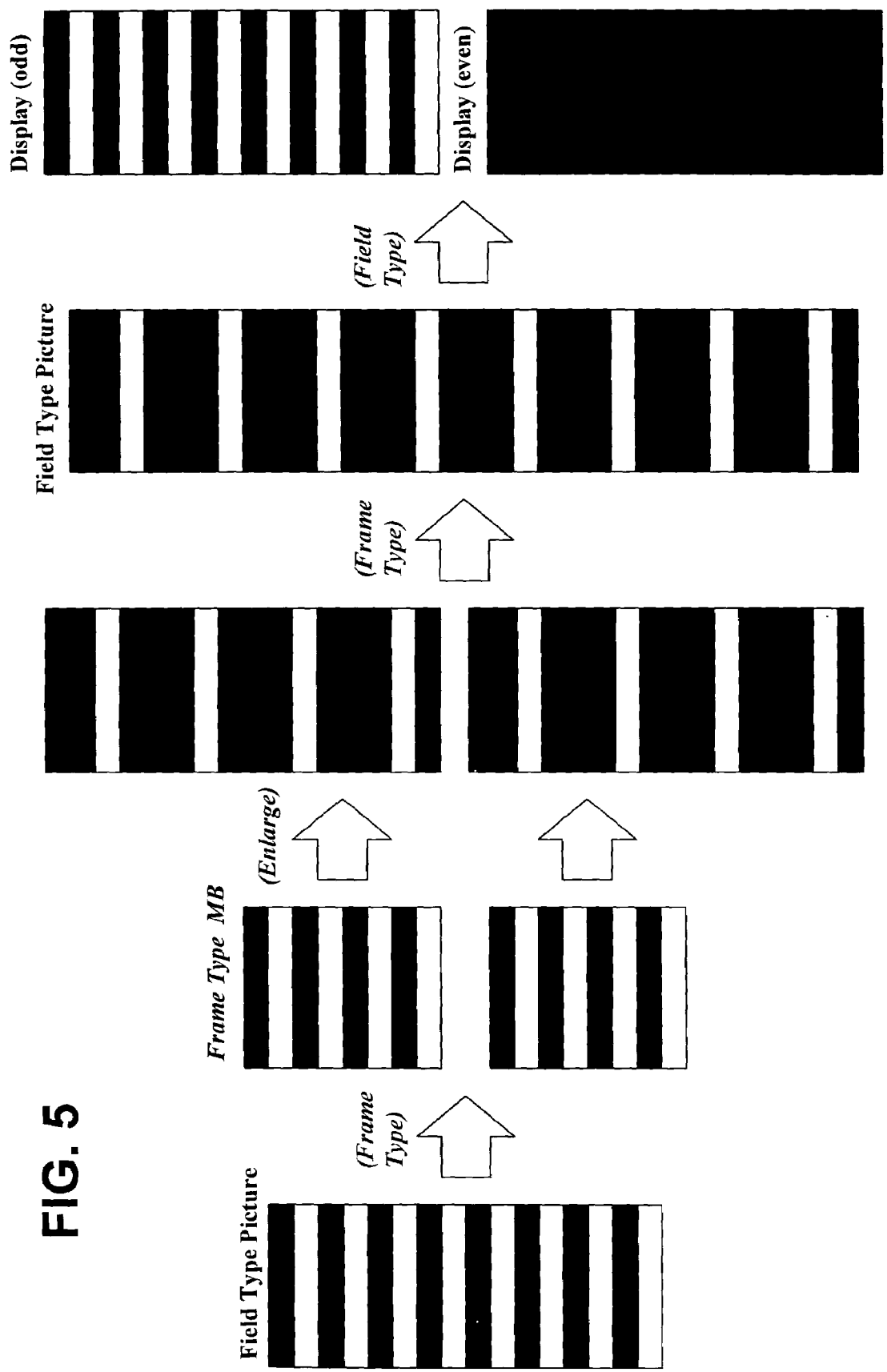
FIG. 5 illustrates an example wherein frame-type macro blocks are enlarged in an abnormal manner.
Figure 6:
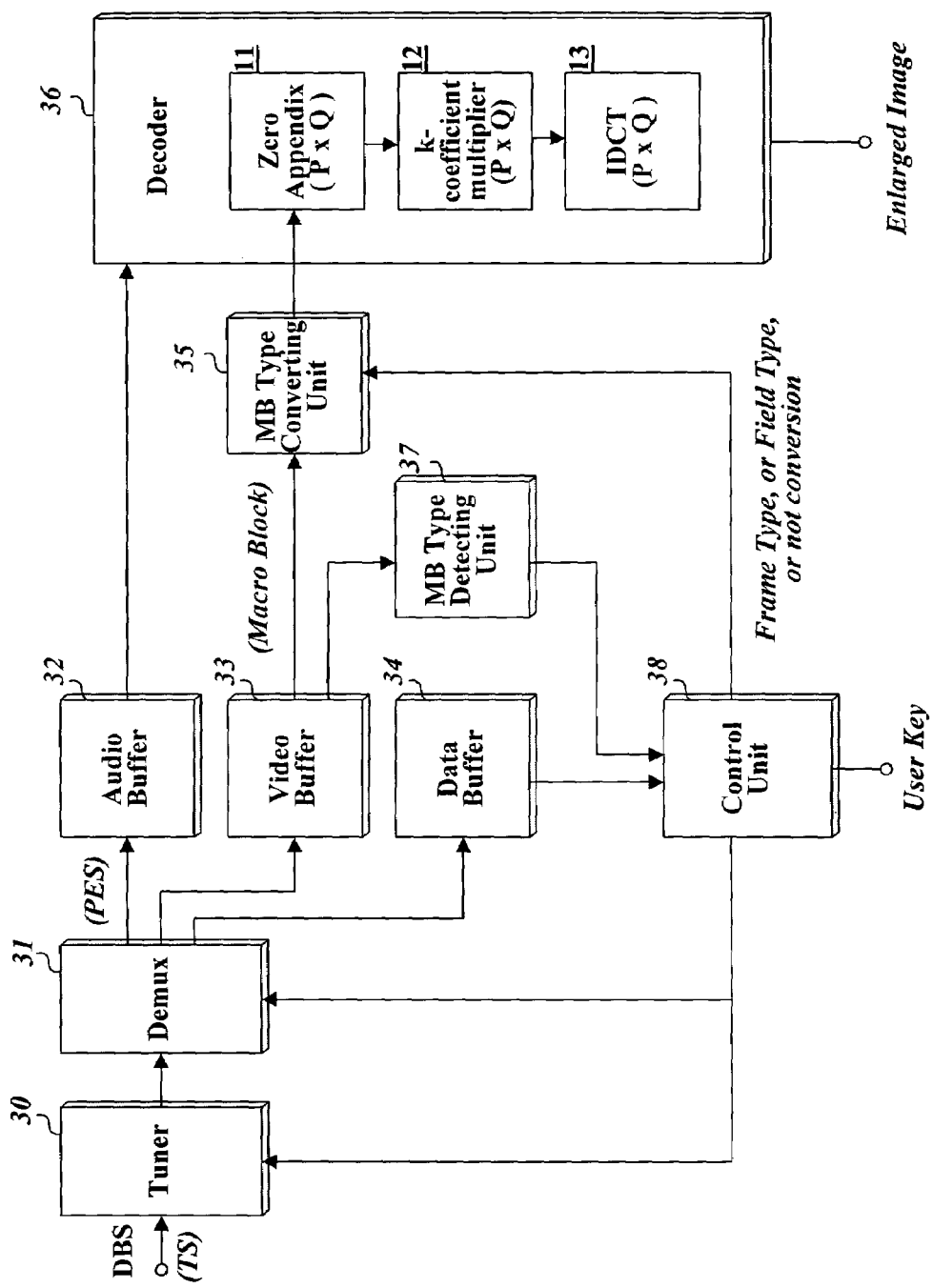
FIG. 6 depicts a block diagram of a digital broadcast receiver in which the present invention may be advantageously embodied.

FIG. 6 depicts a block diagram of a digital broadcast receiver in which the present invention may be embodied. The digital broadcast receiver comprises a tuner 30, a demultiplexer 31, an audio buffer 32, a video buffer 33, a data buffer 34, and a decoder 36 including the zero appending unit 11, the k-coefficient multiplying unit 12, and the IDCT unit 13 explained above with reference to FIG. 1.

The digital broadcast receiver further comprises a macro block type converting unit 35 and a macro block type detecting unit 37. The macro block type converting unit 35 converts the encoding type of macro blocks of the source image temporarily stored in the video buffer 33 after outputted by the demultiplexer 31 from a frame type to a field type or vice versa. The macro block type detecting unit 37 detects the encoding type of the macro blocks.

Also, the digital broadcast receiver further includes a control unit 38 that checks the encoding type of the source image using the information about the video data temporarily stored in the video buffer 34, compares the encoding type of the source image and the encoding type of the macro blocks detected by the macro block type detecting unit 37, and controls the operation of the macro block type converting unit 35 for making the encoding type of the macro blocks coincide with that of the source image. All the components of the digital broadcast receiver are operatively coupled.

Suppose that a digital broadcast stream transmitted in the form of a transport stream (TS) is received by the tuner 30, and processed and outputted as a packetized elementary stream (PES) by the demultiplexer 31. In this case, the control unit 38 scans picture coding extension information for the progressive_frame field to identify the encoding type of the source image of the received digital broadcast, as shown in FIG. 7.

For instance, if a 1-bit progressive_frame field in the picture coding extension information of the received TS is set to '1', then the source image is determined to be frame-type encoded. If a progressive_frame field of the picture coding extension information is '0' and a progressive_sequence field of sequence extension information in the received TS is '1', the macro blocks are determined to be also frame-type encoded, as shown in FIG. 8.

The value of the progressive_sequence field is not always set to '1' even for frame-type source images. Thus the control unit 38 checks the value of a picture_structure field in the picture coding extension information.

Because interlaced display is assumed in reality, frame-type images may be transported with relevant information set as if the images were of field type. Film contents, which are representative frame-type images, need to go through 2:3 pull-down processes. Such 2:3 pulled-down images sometimes have relevant information set as a field type. Nonetheless, the exact encoding type can be easily identified by checking top_field_first and repeat_first_field fields in the picture coding extension information.

The macro block type detecting unit 37 identifies the encoding type of a macro block by checking a dct_type field contained in the header of the macro block, as shown in FIG.

9. For example, if the 1-bit dct_type field is set to '1', the corresponding macro block is discrete cosine transformed as a field type. If not, the corresponding macro block is discrete cosine transformed as a frame type. In another example, the macro block type detecting unit 37 may be included in the control unit 38.

Controlled by the control unit 38, the macro block type converting unit 35 outputs macro blocks received through the video buffer 33 to the decoder 36 after converting the encoding type of the macro blocks or maintaining the original encoding type unchanged.

The decoder 36 resizes the input macro blocks into arbitrary resolutions using the zero appending unit 11, the k-coefficient multiplying unit 12, and the IDCT unit 13. This image resizing operation will be described in detail below.

Figure 10:
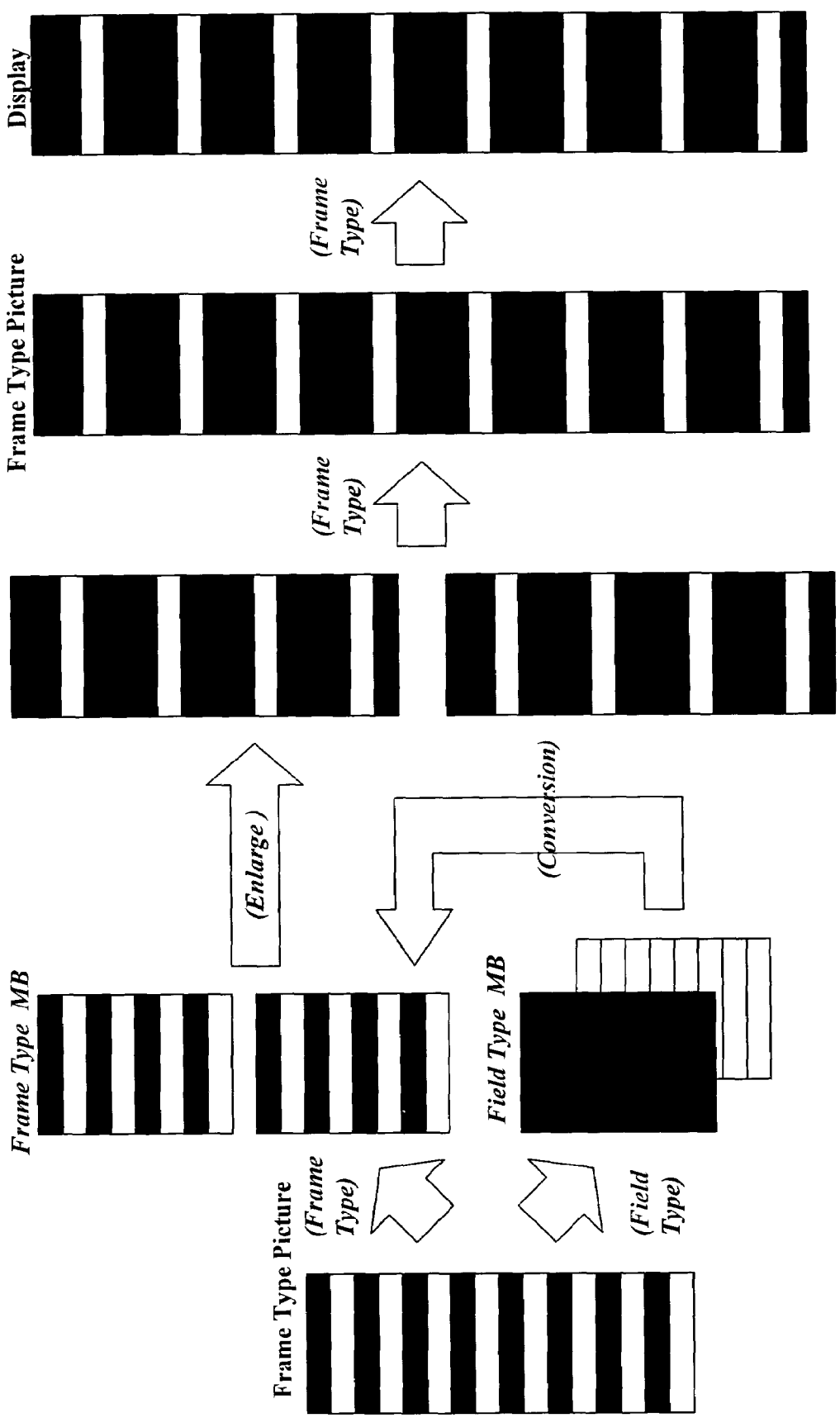
FIGS. 10-11 illustrate examples wherein field-type and frame-type macro blocks are normally enlarged according to the present invention.

In the case where the data received from the demultiplexer 31 are frame-type pictures as illustrated in FIG. 10, the control unit 38 finds that the input images are frame-type pictures by checking the progressive_frame, progressive_sequence, and picture_structure information, as explained above with reference to FIGS. 7 and 8.

A macro block received by the macro block type converting unit 35 is either a frame-type macro block or a field-type macro block, as depicted in FIG. 10. If the 1-bit dct_type field is verified to be '1' by the macro block type detecting unit 37, the control unit 38 finds that the corresponding macro block is discrete cosine transformed as a frame type.

If both of the source picture and the macro block are of frame type, the macro block type converting unit 35 outputs the macro block to the decoder 36 with no converting operation, the operation being supervised by the control unit 38.

If the 1-bit dct_type field is verified to be '0' by the macro block type detecting unit 37, the control unit 38 finds that the corresponding macro block is discrete cosine transformed as a field type, which indicates that the source image and the corresponding macro block have different encoding types. In this case, the control unit 38 makes the encoding type of the macro block identical to that of the source image by having the macro block type converting unit 35 convert the encoding type of the macro block into a frame type.

As a result, a frame-type original image having 8 black horizontal lines alternate with 8 white horizontal lines becomes made up of discrete cosine transformed macro blocks each having 4 black horizontal lines alternate with 4 white horizontal lines, as shown in FIG. 10. The decoder 36 enlarges these macro blocks to macro blocks each having 16 lines wherein black, gray, white, and gray lines are displayed repeatedly in such order.

If the enlarged macro blocks are merged into a frame-type picture, the enlarged picture contains 32 horizontal lines having repeated black, gray, white, and gray lines. As a result, if the enlarged picture is displayed by the progress scan scheme, a naturally enlarged image is obtained.

Figure 11:
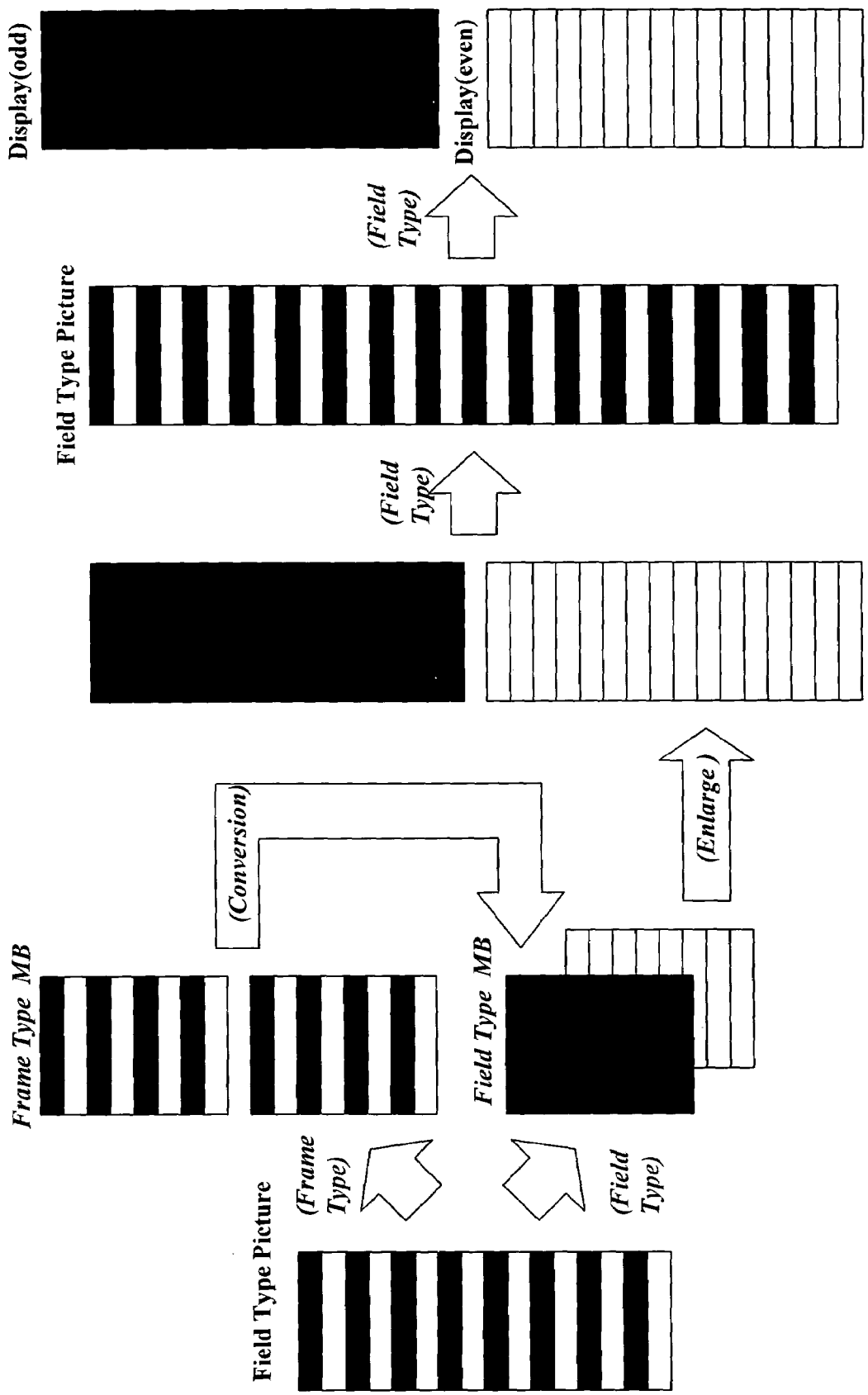

On the other hand, in the case where the data received from the demultiplexer 31 are field-type pictures as illustrated in FIG. 11, the control unit 38 finds that an input picture is an even-field or an odd-field picture by checking the progressive_frame, progressive_sequence, and picture_structure information, as explained above with reference to FIGS. 7 and 8.

A macro block received by the macro block type converting unit 35 is either a frame-type macro block or a field-type macro block, as depicted in FIG. 11. If the 1-bit dct_type field is verified to be '0' by the macro block type detecting unit 37, the control unit 38 finds that the corresponding macro block is discrete cosine transformed as a field type.

If both of the source picture and the macro block are of field type, the macro block type converting unit 35 outputs the macro block to the decoder 36 with no converting operation, the operation being supervised by the control unit 38.

If the 1-bit dct_type field is verified to be '1' by the macro block type detecting unit 37, the control unit 38 finds that the corresponding macro block is discrete cosine transformed as a frame type, which indicates that the source image and the corresponding macro block have different encoding types. In this case, the control unit 38 makes the encoding type of the macro block identical to that of the source image by having the macro block type converting unit 35 convert the encoding type of the-macro block into a field type.

As a result, a frame-type original image having 8 black horizontal lines alternate with 8 white horizontal lines becomes made up of discrete cosine transformed macro blocks each having 8 black horizontal lines or 8 white horizontal lines, as shown in FIG. 11. The decoder 36 enlarges the macro blocks to macro blocks having 16 black horizontal lines or 16 white horizontal lines.

If the enlarged macro blocks are merged into a field-type picture, the merged enlarged picture contains 16 black horizontal lines alternate with 16 white horizontal lines. As a result, if the enlarged picture is displayed by the interlaced scan scheme, black lines are displayed by the odd field and white lines are displayed by the even field, thereby presenting a naturally enlarged image.

Figure 12:
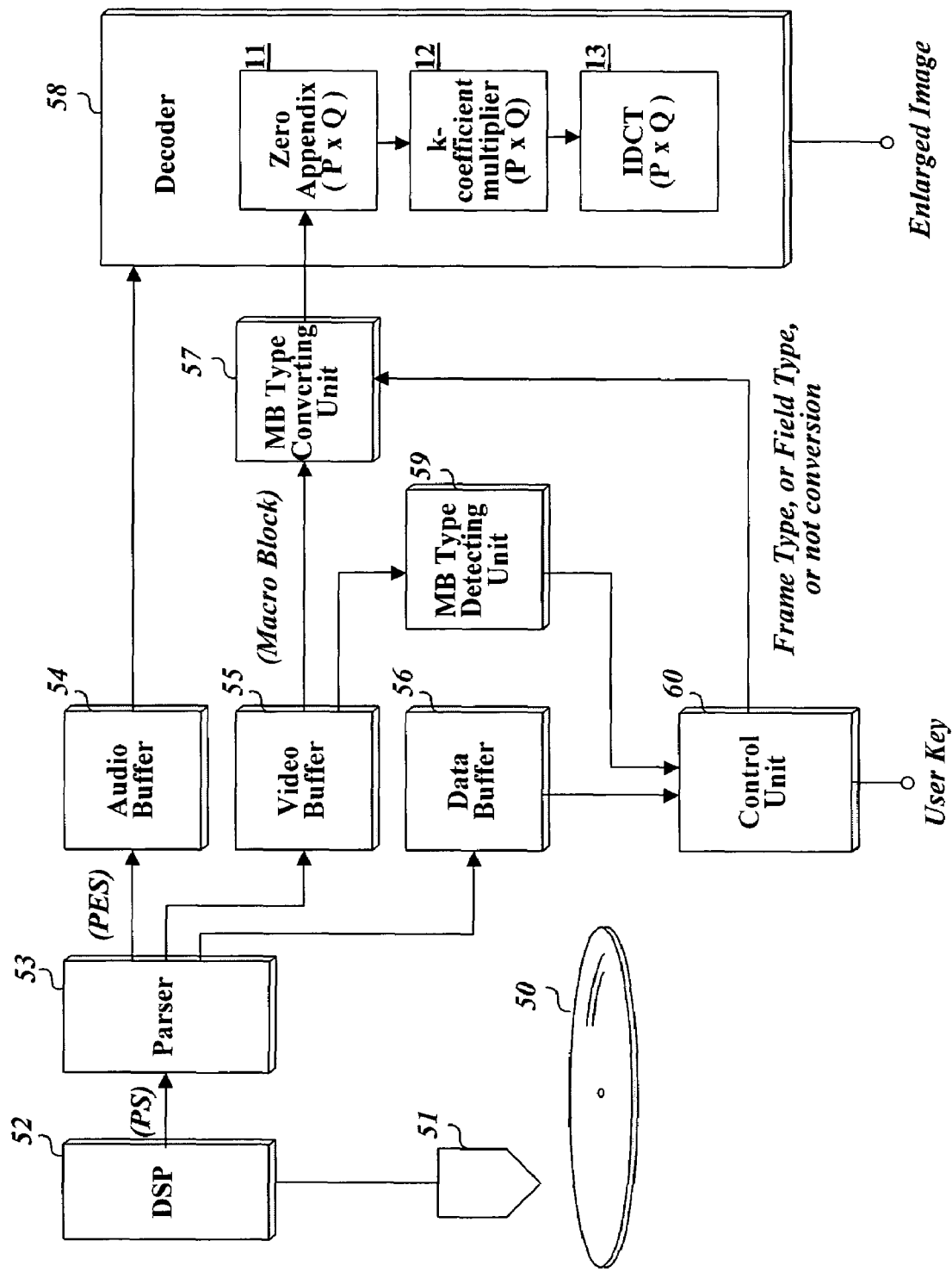
FIG. 12 depicts a block diagram of an optical disk drive in which the present invention may be advantageously embodied.

Shown in FIG. 12 is a block diagram of an optical disk apparatus such as a DVD player. The optical disk apparatus comprises an optical pickup 51, a digital signal processing unit 52, a parser 53, an audio buffer 54, a video buffer 55, a data buffer 56, and a decoder 58 including the zero appending unit 11, the k-coefficient multiplying unit 12, and the IDCT unit 13.

The optical disk apparatus further comprises a macro block type converting unit 57, a macro block type detecting unit 59, and a control unit 60. All the components of the optical disk apparatus are operatively coupled.

Referring to FIG. 12, the optical pickup 51 reads signals recorded on an optical disk 50 (or other recording medium) and the digital signal processing unit 52 processes the signals received from the optical pickup 51 to produce a program stream (PS).

The parser 53 converts the program stream into a packetized elementary stream (PES) and separates video, audio, and data from the packetized elementary stream. The video, audio, and data are provided to the video buffer 54, the audio buffer 55, and the data buffer 56, respectively.

The control unit 60 checks the progressive_frame, progressive_sequence, and picture_structure information to identify the encoding type of the source image stored on the optical disk 50 as discussed above, the information being reproduced from the optical disk 50.

The macro block type detecting unit 57 identifies the encoding type of a macro block by checking the dct_type field contained in the header of the macro block as discussed above.

The macro block type converting unit 55 outputs macro blocks received through the video buffer 53 to the decoder 58 after converting the encoding type of the macro blocks or maintaining the original encoding type unchanged as discussed above.

The decoder 58 resizes the input macro blocks into arbitrary resolutions using the zero appending unit 11, the k-coefficient multiplying unit 12, and the IDCT unit 13. The macro block type converting unit 57 makes the encoding type of macro blocks identical to the encoding type of the original image as explained above with reference to FIGS. 10 and 11, thereby producing an image normally enlarged by the discrete cosine transform.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for resizing an image using an inverse discrete cosine transform (IDCT), the method comprising the steps of:
   (a) checking an encoding type of an original source image and an encoding type of discrete cosine transformed macro blocks;
   (b) selectively converting the encoding type of said macro blocks so that the encoding type of said macro blocks coincides with the encoding type of said original source image, only if the checked two encoding types are different;
   (c) selectively using the inverse discrete cosine transform to enlarge said converted macro blocks and macro blocks that have not been converted; and
   (d) merging the enlarged macro blocks to thereby enlarge the original source image.

2. The method as set forth in claim 1, wherein in said step (a), the encoding type of said original source image is identified as either a field type or a frame type by using at least progressive_sequence information or picture_structure information.

3. The method as set forth in claim 1, wherein in said step (a), the encoding type of said macro block is identified as either a field type or a frame type by using DCT_type information contained in a header of said macro block.

4. The method as set forth in claim 1, wherein said original source image is received through a digital broadcast.

5. The method as set forth in claim 1, wherein said original source image is reproduced from an optical disk.

6. The method as set forth in claim 1, wherein if the encoding type of said original source image is a frame type and the encoding type of said macro block is a field type, then said step (b) converts the encoding type of said macro block from the field type into a frame type.

7. The method as set forth in claim 1, wherein if the encoding type of said original source image is a field type and the encoding type of said macro block is a frame type, then said step (b) converts the encoding type of said macro block from the frame type into a field type.

8. An apparatus for resizing an image using an inverse discrete cosine transform (IDCT), the apparatus comprising:
   detecting means for detecting an encoding type of macro blocks;
   converting means for converting the encoding type of said macro blocks to either a field type or a frame type;
   control means for detecting an encoding type of an original source image, and selectively controlling said converting means so that the encoding type of said macro blocks is converted into the encoding type of said original source image, only if the encoding types of said macro blocks and said original source image are different;
   enlarging means for selectively using the inverse discrete cosine transform to enlarge said macro blocks received from said converting means and macro blocks that have not been converted; and
   merging means for merging the enlarged macro blocks to thereby enlarge the original source image.

9. The apparatus as set forth in claim 8, wherein said detecting means identifies the encoding type of said macro block as either a field type or a frame type by examining DCT_type information contained in a header of said macro block.

10. The apparatus as set forth in claim 8, wherein said control means identifies the encoding type of said original source image as either a field type or a frame type by examining at least progressive_sequence information or picture_structure information.

11. The apparatus as set forth in claim 8, wherein said original source image is received through a digital broadcast.

12. The apparatus as set forth in claim 8, wherein said original source image is reproduced from an optical disk.

13. The apparatus as set forth in claim 8, wherein if the encoding type of said original source image is a frame type and the encoding type of said macro block is a field type, then said converting means converts the encoding type of said macro block from the field type into a frame type.

14. The apparatus as set forth in claim 8, wherein if the encoding type of said original source image is a field type and the encoding type of said macro block is a frame type, then said converting means converts the encoding type of said macro block from the frame type into a field type.

15. An apparatus for resizing an image using an inverse discrete cosine transform (IDCT), the apparatus comprising:
   (a) means for checking an encoding type of an original source image and an encoding type of discrete cosine transformed macro blocks;
   (b) means for selectively converting the encoding type of said macro blocks so that the encoding type of said macro blocks coincides with the encoding type of said original source image, only if the checked two encoding types are different; and
   (c) means for selectively using the inverse discrete cosine transform to enlarge said converted macro blocks and macro blocks that have not been converted; and
   (d) means for merging the enlarged macro blocks to thereby enlarge the original source image.

* * * * *